Inventor
GEORGE H. CONNORS.
FRED C. STIFF.

By
Attorneys

July 21, 1936.　　G. H. CONNORS ET AL　　2,048,180
AUTOMATIC COUPLING DEVICE FOR TRAILERS
Filed June 21, 1932　　6 Sheets-Sheet 3

Inventors
GEORGE H. CONNORS.
FRED C. STIFF.
By Robert Robb
Attorneys

July 21, 1936.  G. H. CONNORS ET AL  2,048,180
AUTOMATIC COUPLING DEVICE FOR TRAILERS
Filed June 21, 1932  6 Sheets-Sheet 4

Inventors
GEORGE H. CONNORS.
FRED C. STIFF.
By Robb & Robb
Attorneys

July 21, 1936.  G. H. CONNORS ET AL  2,048,180
AUTOMATIC COUPLING DEVICE FOR TRAILERS
Filed June 21, 1932   6 Sheets-Sheet 6

Inventor
GEORGE H. CONNORS.
FRED C. STIFF.

By Robert Cobb
Attorneys

Patented July 21, 1936

2,048,180

UNITED STATES PATENT OFFICE 2,048,180

AUTOMATIC COUPLING DEVICE FOR TRAILERS

George H. Connors and Fred C. Stiff, Edgerton, Wis., assignors to Highway Trailer Company, Edgerton, Wis., a corporation Application June 21, 1932, Serial No. 618,577

13 Claims. (Cl. 280—33.1)

This invention has to do with improvements in hose couplings for air and vacuum lines intended for the operation of brakes of vehicles, having to do specifically with an improved hose line connection in a tractor-trailer assembly, there being provided mechanism whereby coupling and uncoupling of the hose lines between the tractor and trailer will be automatically accomplished with the coupling and uncoupling of the tractor and trailer.

In the prior constructions the hose connections have been subject to the danger of injury through the operator of the vehicles for getting to disconnect the brake lines when separating the tractor from the trailer; furthermore, a substantial amount of time was consumed by the operator in connecting or disconnecting the hose lines.

By providing instrumentalities whereby the connections are made and broken automatically, the likelihood of damage is very materially decreased, and there is no loss of time occasioned by the connecting and disconnecting operations.

In the present invention, the trailer is provided with suitable pockets connecting with the hose lines of the trailer leading to the brakes, and which are adapted to receive nozzles in the hose lines of the tractor, means being also provided for retaining these nozzles in position to readily effect the coupling operation as soon as the tractor and trailer are coupled together. Means are also provided for allowing free motion of the connections to correspond to the action of the tractor and trailer in rounding curves. There must also be provided instrumentalities for securely holding the nozzles in air-tight position in the sockets while the vehicles are coupled.

The mechanism of the present invention is adapted to be employed for any standard make of vehicles, instrumentalities being mounted on the fifth wheel members of the respective vehicles.

The details of the mechanism of the present invention will be apparent from a consideration of the accompanying drawings and the details of description thereof, set forth in the following specification.

In the accompanying drawings—

It will be understood that the details of the invention as shown in the drawings may be modified considerably without departing from the inventive concept, the illustrated details being regarded in the light of examples of one form of arrangement of the parts.

It will be also understood that any conventional fifth wheel construction may be employed, the tractor carrying the usual lower fifth wheel member, and the trailer the upper fifth wheel member.

Figure 3:
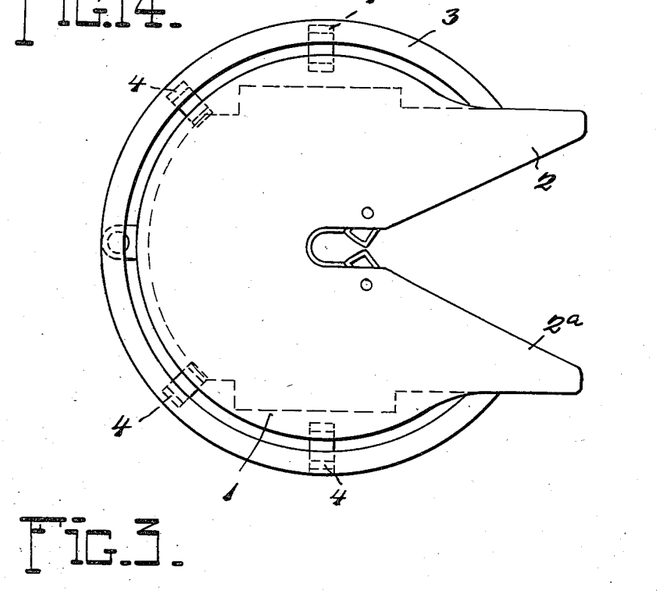
Figure 3 is a top plan view of a lower fifth wheel member showing certain features of the invention applied thereto.

The lower fifth wheel member, illustrated in Figure 3, is designated by the numeral 1, and may be provided with the wings 2 and 2a. Welded to the wings 2 and 2a and extending around the fifth wheel member 1 is an arcuate track 3, which is supported by a plurality of supporting brackets 4 suitably secured to the track 3 and to the fifth wheel member in suitable manner, as by welding. The brackets 4 form a T with the track, this being desirable for reasons which will be hereinafter set forth.

Mounted on the track 3 is the hose carrier 5, which is secured to the track 3 by means of bolts 6 and the gibs 7 which are threadedly secured to the bolts 6. Surrounding the bolts 6 are the rollers 8, which bear against the sides of the track 3, and are held in position between the hose carrier 5 and the gibs 7. It will be seen, therefore, that the track engaging surface of the hose carrier 5 overhangs the track 3, so that the rollers may be provided and form a suitable anti-friction bearing for allowing free movement of the hose carrier 5 around the track 3. It will be seen that the T-shaped connections between the track 3 and supporting brackets 4 allow free passage of the gibs 7 past these brackets as the hose carrier 5 moves along the track.

The hose carrier 5 is provided with elongated openings 9 through which pass the nozzles 10 of the hose lines 11. These elongated openings provide space for movement of the nozzles vertically to compensate for any slight separation of the upper and lower fifth wheel members when the vehicles are travelling on rough roads. The nozzles 10 are held in horizontal position by the action of springs 12 mounted within the hose carrier 5 and bearing against nozzles 10. As will be seen, the hose lines 11 are connected with the nozzles 10 by means of the threaded connector 13.

Figures 4, 15:
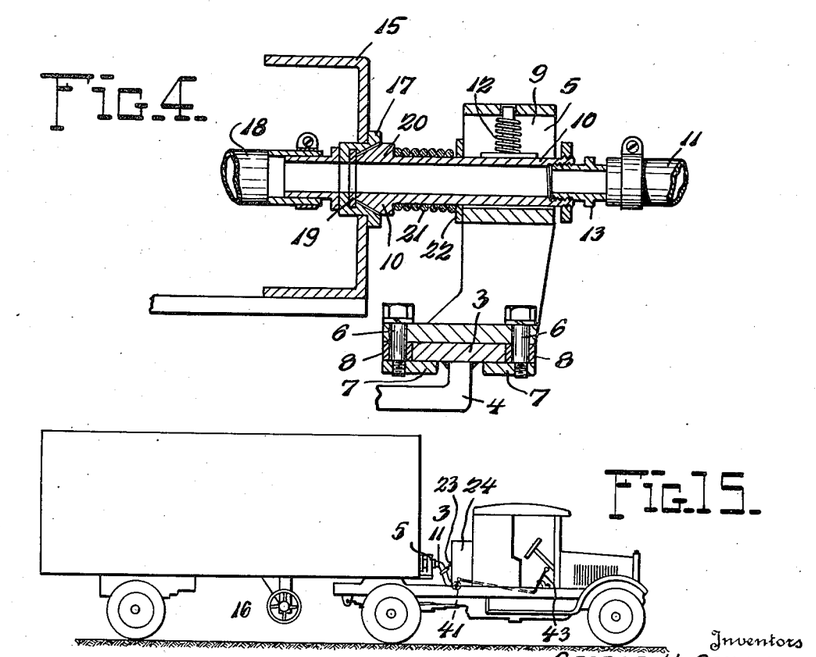
Figure 4 is a detailed vertical sectional view of the hose coupling instrumentalities, showing the nozzle of one hose line fitted into its pocket in the trailer frame, the figure being taken on the line 4—4 of Figure 5, and showing a somewhat different adaptation of the invention from that illustrated in Figure 1.
Figure 15 is a general somewhat diagrammatic illustration of a tractor and trailer coupled together, showing the air line connections of the present invention.
Figure 11:
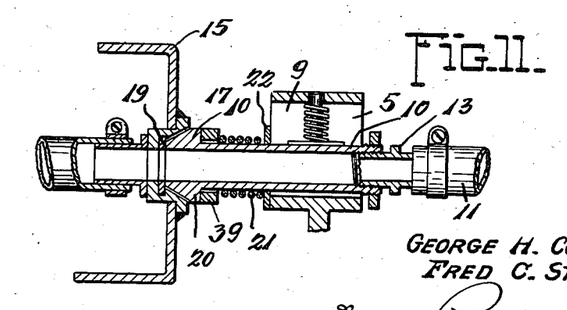
Figure 11 is a sectional view on the line 11—11 of Figure 8.

Referring now for the moment to the trailer, the frame of which is designated at 14, and the movable auxiliary frame at 15, which carries the usual supporting jack 16 for the full automatic type of trailer, the auxiliary frame 15 is provided with the nozzle receiving sockets 17 which connect with the hose lines 18 leading to the brakes of the trailer. These sockets 17 are provided with apertured gaskets 19 suitably of resilient material, such as rubber, which gaskets are permanently secured in place as will be seen from Figures 4 and 11, they being fitted into a suitable recess in the socket 17. To facilitate connection with the nozzles 10, the sockets 17 are tapered on the inside, the nozzles 10 being correspondingly tapered to slip into the sockets with the heads thereof abutting against the gasket to produce a leak-proof joint. To maintain a close contact between the nozzles 10 and the sockets 17, the tapered head 20 of the nozzle forms a collar therewith, against which bears a spring 21 against which abuts the end part of a yoke 39 spanning the nozzles and seated at the other end against washers 22 which ride over the elongated openings 9 in the hose carrier 5 as the nozzles 10 move vertically. It will be understood that the springs 21 are of sufficient strength to hold a tight connection between the nozzles 10 and the sockets 17 under usual brake pressures. If, however, unusually high pressures are to be employed, as in the case of heavy vehicles, the mechanism illustrated in Figures 1, 2, and 8 to 14 inclusive may be utilized in order to assure a tight connection between the nozzles and the gaskets under these high pressures.

Figure 5:
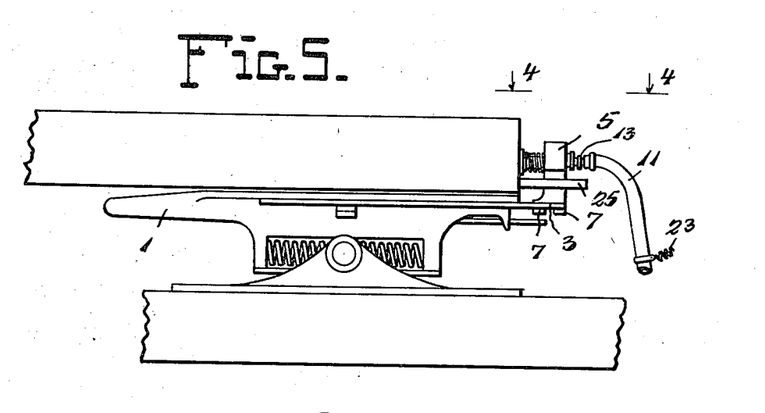
Figure 5 is a side elevation illustrating a lower and upper fifth wheel in coupled relation and showing the automatic air line coupling instrumentalities in coupled position.
Figure 6:
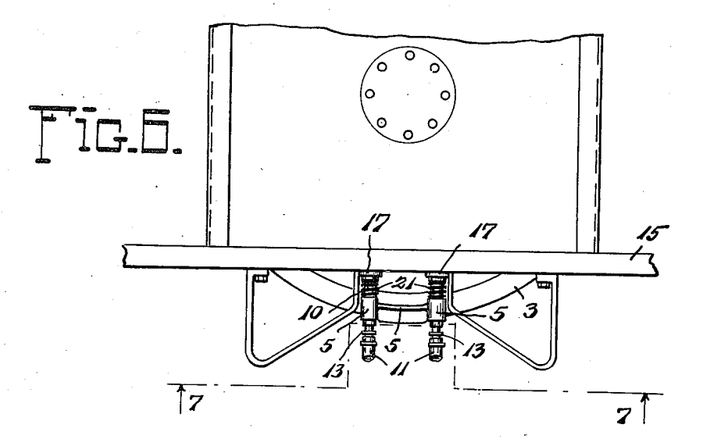
Figure 6 illustrates a top plan view of the frame of the trailer shown in Figure 5, together with the upper fifth wheel.
Figure 7:
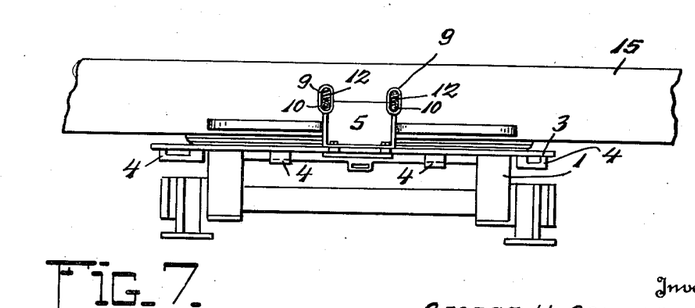
Figure 7 is a front view of Figure 6, looking in the direction of the arrows on the line 7—7.

The hose line 11 is of course of sufficient length to allow full turning of the hose carrier 5. When the tractor and trailer are uncoupled, the hose line will be held normally at the approximate center of the tractor chassis by spring 23, Figure 15, which is secured to any convenient part of the tractor, as for example, to the air compressor 24. The nozzles 10 are guided into the sockets 17 by the guides 25, Figures 2 and 5, mounted on the auxiliary frame 15 of the trailer. These guides also serve to propel the hose carrier 5 along the track 3 during the turning of the fifth wheels when the tractor and trailer are coupled.

Figures 1, 2:
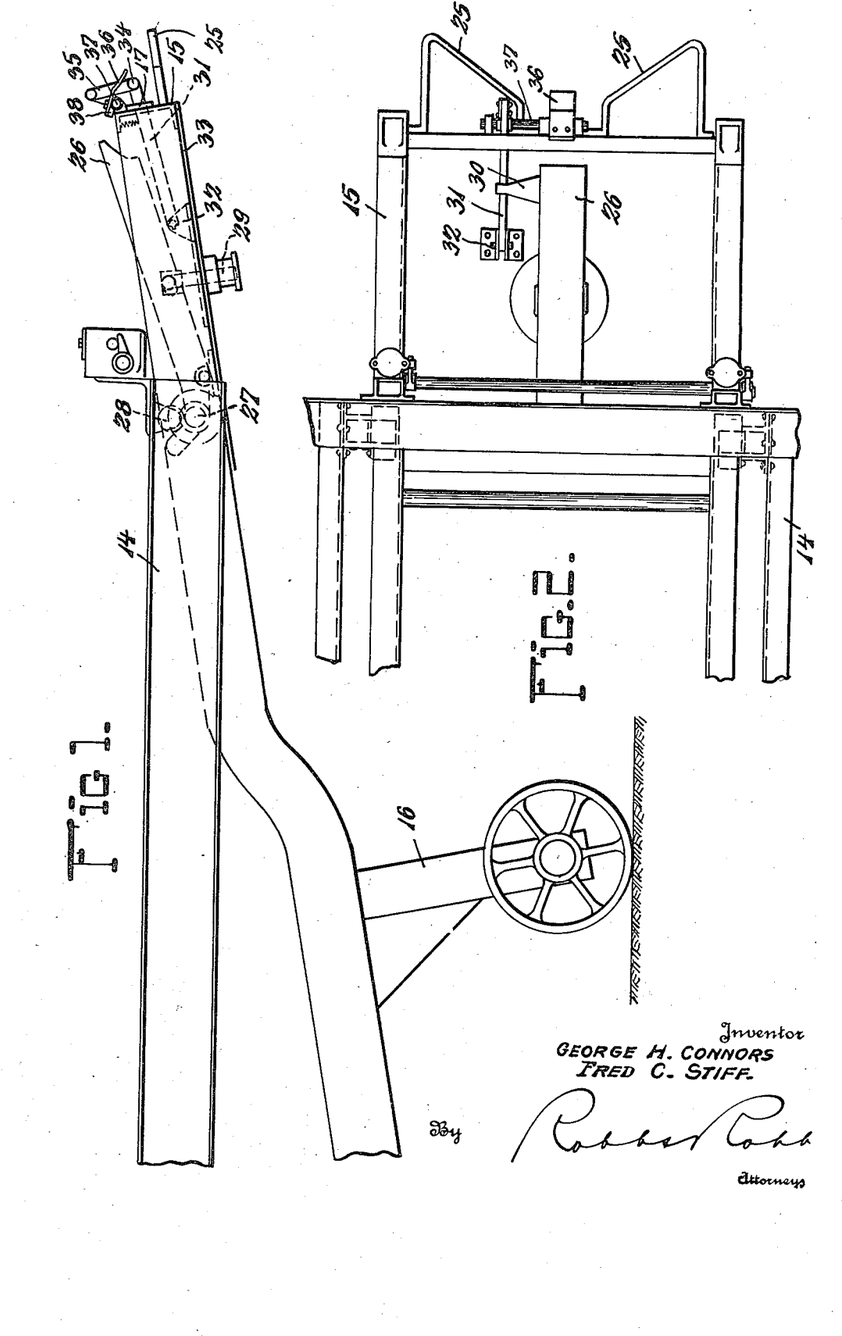
Figure 1 represents a fragmentary side elevation of a portion of a trailer of standard construction provided with certain features of the present invention.
Figure 2 is a top plan view of the front end of the construction of Figure 1.
Figure 8:
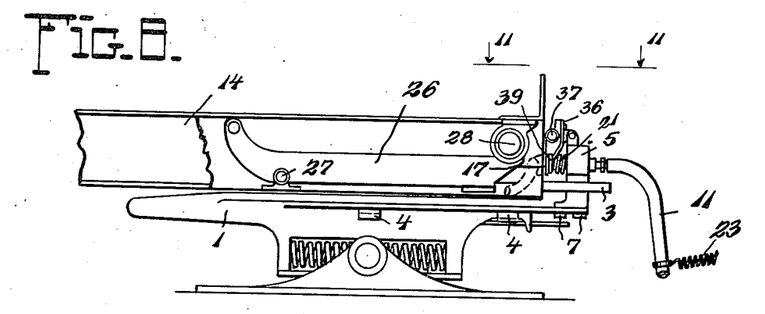
Figure 8 is a view similar to Figure 5 but showing the adaptations of the invention illustrated in Figure 1.
Figure 9:
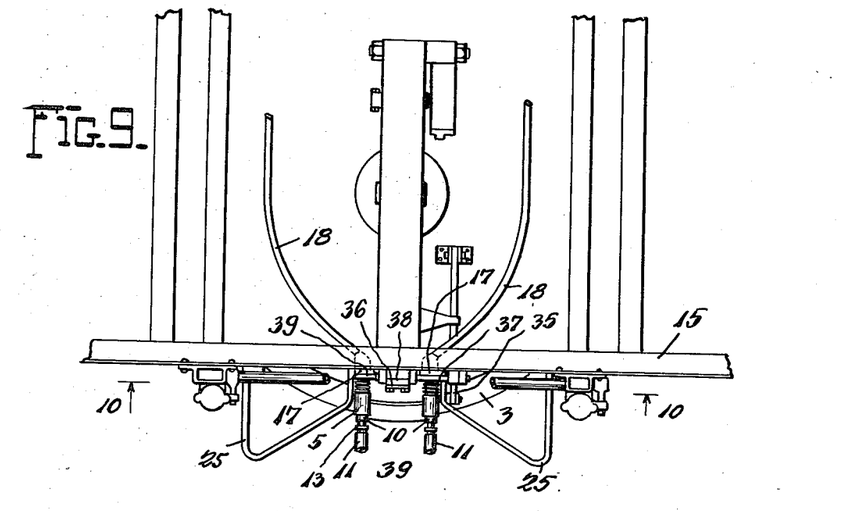
Figure 9 is a top plan view of the construction illustrated in Figure 8.
Figure 10:
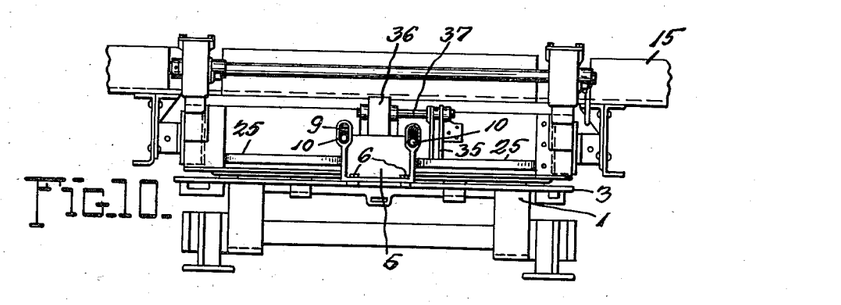
Figure 10 is a front view of Figure 9, looking in the direction of the arrows on the line 10—10.

In Figure 1 the trailer is shown disconnected from the tractor, and in Figure 8 the trailer and tractor are shown as coupled. The mechanisms just referred to are operated by means of the movement of a lever 26, which is pivoted on the pin 27, and rides under the rod 28 as the auxiliary frame 15 is pushed backwardly under the coupling action of the vehicles. As this auxiliary frame 15 is pushed backwardly, it will be apparent that the lever 26 will be depressed as shown in Figure 8, thus causing the locking pin 29 to be lowered to couple with the lower fifth wheel member, the locking pin 29 being actuated by the lever 26 as will be apparent from Figure 1.

To increase the efficiency of the couple between the nozzles and their complemental sockets, we have provided an assembly which includes a lever 26 provided with an extension 30, Figure 2, which acts upon the arm 31 which is pivoted in the bracket 32 mounted on the upper fifth wheel member 33. The arm 31 is pivoted at 34 to the arm 35 which actuates a leaf spring 36 which is turnably mounted at 37 to the auxiliary frame. The spring 36 is connected with the pivot 37 by the member 38, serving as a backing for the spring.

Figure 12:
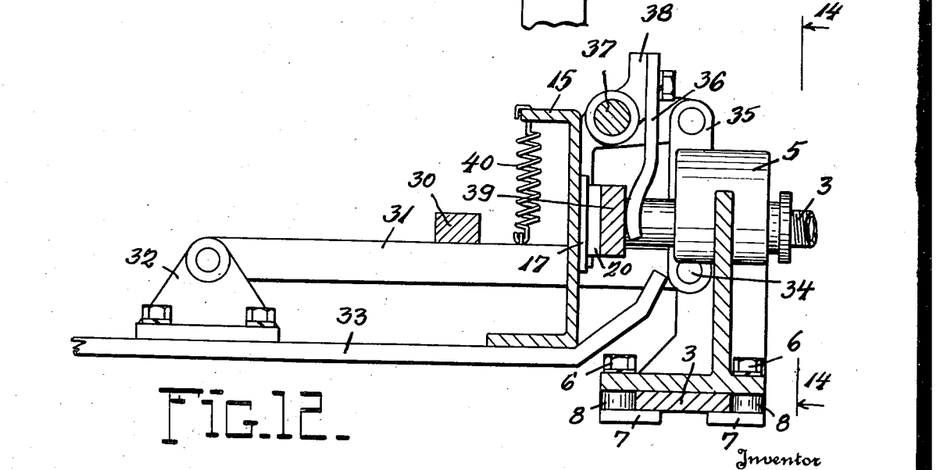
Figure 12 is an enlarged sectional view of the coupling mechanism illustrated in Figure 8, and taken on the line 12—12 of Figure 13.
Figure 13:
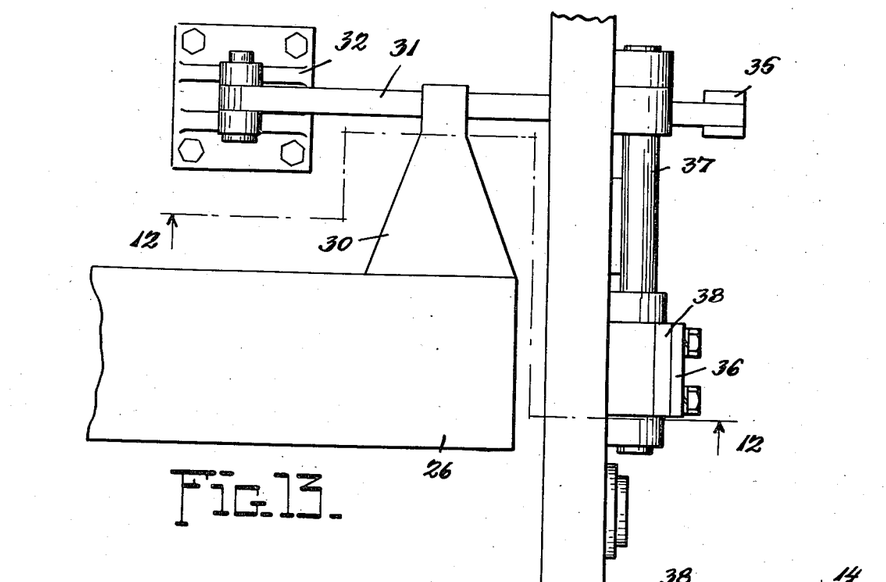
Figure 13 is a top view of the mechanism shown in Figure 12.
Figure 14:
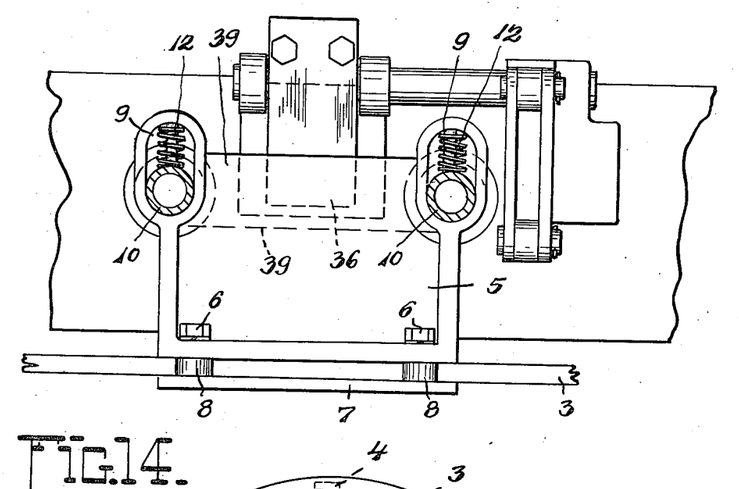
Figure 14 is a front view of the mechanism of Figure 12.

Connecting the nozzles is a yoke 39, Figure 12, which is in the nature of a cross bar with bifurcated or other suitably recessed ends for engaging with the nozzles 10, the spring 36 being positively pressed against this yoke when the lever 26 is depressed incident to when the vehicles are coupled through the assembly just described, thus pressing the yoke firmly against the nozzles, thereby securing the nozzles tightly against the gaskets 19.

In order to support the arm 31 in proper position and to bias it toward raised position to lift the spring 36, there is provided a suspension spring 40 therefor, this spring being connected to the arm 31 and to the auxiliary frame 15 of the trailer in any suitable manner to resiliently support the arm 31. When the lever 26 is released incident to uncoupling of the vehicles, the leaf spring 36 is released from engagement with the yoke.

It is believed that the operation of the invention will be apparent from the drawings and from the above description, and therefore only a relatively short summary need be given, it being understood that the coupling action between the tapered heads 20 and their receiving sockets on the trailer will be the same irrespectively of whether or not the clamping spring and yoke are employed for additional clamping action on the nozzles to hold them in place; and it will be also understood that normally the spring 23 will hold the hose carrier at approximately the middle of the tractor chassis.

Because of the fact that these features are common to the two forms of invention herein illustrated and described, the coupling action will become clear incidentally to the description of the operation of the action of the clamping spring 36 and the actuating mechanism therefor for applying this spring to and releasing it from the yoke 39.

Referring, therefore, to the operation of the form of the invention illustrated in Figures 1 and 8 to 14 inclusive, it will be seen that when the tractor and trailer are disconnected, the trailer supporting jack 16 is in its supporting position, and the lever 26 is raised. The spring 36 is in disengaging position.

As the tractor and trailer are coupled, the hose carrier 5 engages the guides 25 and is moved thereby so as to bring the tapered heads 20 into seating engagement with their sockets 17. As the coupling of the vehicles is effected, the auxiliary frame 15 of the trailer, and of course, the upper fifth wheel member, are pushed rearwardly of the trailer, causing the supporting jack 16 to be raised. Simultaneously with this, the lever 26 is pressed under the bar or rod 28, and is accordingly depressed as shown in Figure 8, thereby dropping the locking pin into the opening therefor in the lower fifth wheel member.

As the lever 26 is depressed, the extension 30 is forced against the arm 31, pressing this arm 31 downwardly, correspondingly pulling the arm 35 downwardly to turn the spring 36 about its pivot 37, the spring 36 engaging the yoke 39 when the coupling action is completed, it being understood that the yoke is mounted across the nozzles, as previously described, retaining the nozzles in their respective sockets.

The hose carrier 5 is freely turnable on the track 3, which is of generally circular configuration, through the anti-friction action of the rollers 8, thereby preserving engagement between the tapered heads 20 and their receiving sockets when the vehicles are rounding curves. The spring 21 and the spring 36 engages the yoke 39 when this arrangement is employed firmly hold the nozzles in position in their sockets under all conditions of operation.

When the vehicles are uncoupled, the above action is reversed, the spring 36 being released by the lifting of the lever 26 as the auxiliary frame and upper fifth wheel member pull forwardly to lower the supporting jack incidental to the uncoupling operations. It will be understood in this connection that there is provided in the air lines 11 a valve 41 of standard construction operable by a valve lever 43 conveniently positioned in the cab of the tractor for ready access to the operator, so that the operator may close the lines 11 before separating the tractor from the trailer.

Having thus described our invention, what we claim as new and desire to secure by Letters Patent of the United States, is—

1. Connecting mechanism for hose lines of vehicles provided with a usual fifth wheel member, comprising, in combination, a hose line and a nozzle connected thereto, a carrier device for the nozzle, a track secured to the fifth wheel member, and instrumentalities for mounting the carrier device upon the track allowing free movement of the carrier device along the track.

2. Connecting mechanism for hose lines of vehicles provided with a usual fifth wheel member, comprising, in combination, a hose line and a nozzle connected thereto, a carrier device for the nozzle, an arcuate track mounted on the fifth wheel member, instrumentalities for mounting the carrier device upon the track including anti-friction rollers adapted to move along the track and devices for securing the rollers in position, and means for supporting the track while allowing free passage of the rollers as the carrier device moves along the track.

3. Coupling mechanism for hose lines of vehicles adapted to be coupled together, comprising, in combination, brake actuating hose lines on one of the vehicles, each of the hose lines being provided with a nozzle, corresponding hose lines on a second vehicle, each of which is connected with a socket receiving the corresponding nozzle of the first mentioned hose lines into which sockets the nozzles fit as the vehicles are coupled together, guides mounted on the second vehicle adjacent the sockets for guiding the nozzles therein, and means for forcibly pressing the nozzles into engagement with the sockets to prevent accidental separation of the nozzles and sockets while the vehicles are coupled.

4. Coupling mechanism for coupling hose lines of vehicles adapted to be coupled together, comprising, in combination, hose lines mounted on one of the vehicles, each of which lines is provided with a nozzle, nozzle receiving sockets on a second vehicle for receiving the said nozzles, instrumentalities for automatically maintaining the nozzles in position to be received by the sockets as the vehicles are connected, guides mounted on the second vehicle for guiding the nozzles into the sockets as the vehicles are coupled, and instrumentalities for maintaining the nozzles in position in the sockets in all relative positions of the vehicles while coupled.

5. In a mechanism of the character described, in combination, a vehicle carrying a hose line, the vehicle being provided with a fifth wheel, a hose carrier for the hose line, a substantially circular track mounted horizontally on the fifth wheel member, supports for the track secured thereto beneath the track and the fifth wheel member, the supports forming substantially a T-connection with the track, and means for mounting the hose carrier on the track for free movement therealong.

6. In a mechanism of the character described, in combination, a vehicle carrying a hose line and provided with a fifth wheel, a hose carrier for the hose line, a track mounted horizontally around the fifth wheel member and secured thereto, supports for the track secured thereto and to the fifth wheel member, means including rollers engaging the track for movably mounting the hose carrier on the track for free movement therealong, the said supports being disposed to provide a continuously unobstructed path for the passage of the rollers.

7. In combination, a trailer vehicle and a tractor vehicle, said vehicles including service mechanism of the type wherein a service mechanism operating fluid medium is directed from one of the vehicles to the other for performing the service operations, coupling means for coupling the vehicles for combined operation, and including a rockable draft coupling member on one of the vehicles adapted to be rocked during coupling of the vehicles, and coupling means on the vehicles located at a point remote from the draft coupling means mounted for establishment of communication of the fluid medium of one of the vehicles with the service mechanism of the other vehicle incident to rocking of said draft coupling means.

8. In combination, a trailer vehicle having a frame and a tractor vehicle, said vehicles including service mechanism of the type wherein a service mechanism operating fluid medium is directed from one of the vehicles to the other for performing service operations, draft coupling means for coupling and uncoupling the vehicles and coupling means on the vehicles mounted for automatic establishment of communication of the fluid medium of one of the vehicles with the service mechanism of the other vehicle incident to coupling of the vehicles, and guide means on the frame for guiding and serving to align said last mentioned coupling means during coupling of the same.

9. In combination, a trailer vehicle having a frame and a tractor vehicle, said vehicles including service mechanism of the type wherein a service mechanism operating fluid medium is directed from one of the vehicles to the other for performing service operations, draft coupling means for coupling and uncoupling the vehicles, and coupling means on the vehicles mounted for automatic establishment of communication of the fluid medium of one of the vehicles with the service mechanism of the other vehicle incident to coupling of the vehicles, said last mentioned coupling means including a part mounted on the trailer and a cooperating part mounted on the tractor affording a separable connection, and substantially V-shaped guide means mounted on the frame of one of the vehicles for cooperation with the coupling part on the other vehicle and serving to align said parts in the coupling thereof by the reception of the part on the other vehicle within the V.

10. In combination, a trailer vehicle and a tractor vehicle, said vehicles including service mechanism of the type wherein a service mechanism operating fluid medium is directed from one of the vehicles to the other for performing service operations, draft coupling means for coupling and uncoupling the vehicles, coupling means on the vehicles mounted for automatic establishment of communication of the fluid medium of one of the vehicles with the service mechanism of the other vehicle incident to coupling of the vehicles, means for yieldably locking said last mentioned coupling means together, and means for preventing release of said locking means until the vehicles are conditioned for uncoupling of the draft coupling means.

11. In combination, a trailer vehicle and a tractor vehicle, said vehicles including service mechanism of the type wherein a service mechanism operating fluid medium is directed from one of the vehicles to the other for performing service operations, draft coupling means for coupling and uncoupling the vehicles incident to relative movement of the vehicles, coupling means on the vehicles mounted for automatic establishment of communication of the fluid medium of one of the vehicles with the service mechanism of the other vehicle incident to coupling of the vehicles, means for locking said last mentioned coupling means together, and means for actuating said locking means near one end of the relative movement of the vehicles.

12. In combination, a trailer vehicle including a main frame, an auxiliary frame mounted for shifting movement thereon and comprising a unitary fifth wheel and ground engaging support, mounting means for said auxiliary frame affording relative longitudinal movement of said auxiliary frame for shifting said ground engaging support into and out of ground engaging position, a locking pin movably mounted on said fifth wheel, an operating lever operable incident to relative movement of said auxiliary frame for moving said locking pin, service mechanism on said trailer comprising fluid operated instrumentalities, and separate means adapted to connect said fluid operated instrumentalities with a fluid medium on a tractor, said connecting means being positively interengaged by the operation of the locking pin operating lever of the fifth wheel incident to longitudinal shifting of the auxiliary frame as aforesaid.

13. In a tractor-trailer vehicle combination wherein each vehicle is provided with hose lines for the transmission of fluid under pressure to operate service mechanism on one of the vehicles, the combination with coupling means for the said hose lines which includes nozzles, on one group of hose lines, sockets for receiving said nozzles on the other group of hose lines, means for preventing separation of the nozzles and sockets, which includes a yoke interconnecting the nozzles, a spring for urging the yoke in one direction when the vehicles are coupled, and means for moving the spring bodily into and out of operative position incident to coupling and uncoupling of the vehicles.

GEORGE H. CONNORS.
FRED C. STIFF.

CERTIFICATE OF CORRECTION.

Patent No. 2,048,180.                                           July 21, 1936.

GEORGE H. CONNORS, ET AL.

It is hereby certified that error appears in the printed specification of the above numbered patent requiring correction as follows: Page 3, second column, line 35, claim 5, after "and" insert to; and that the said Letters Patent should be read with this correction therein that the same may conform to the record of the case in the Patent Office.

Signed and sealed this 29th day of September, A. D. 1936.

Henry Van Arsdale (Seal)                                            Acting Commissioner of Patents.